Dec. 19, 1933.  E. J. R. BEATTEY  1,940,113
OPHTHALMIC MOUNTING
Filed May 21, 1930
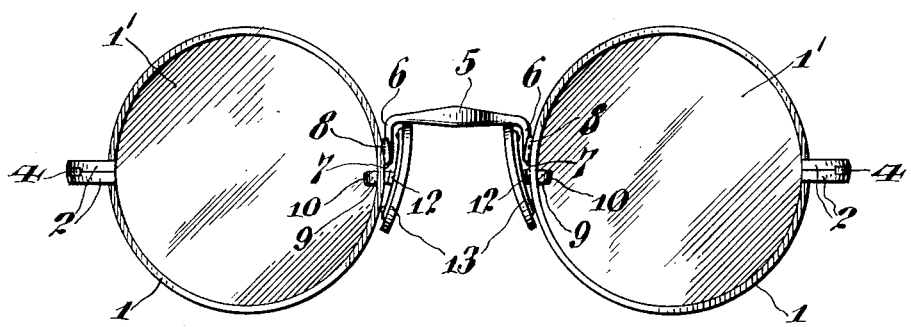
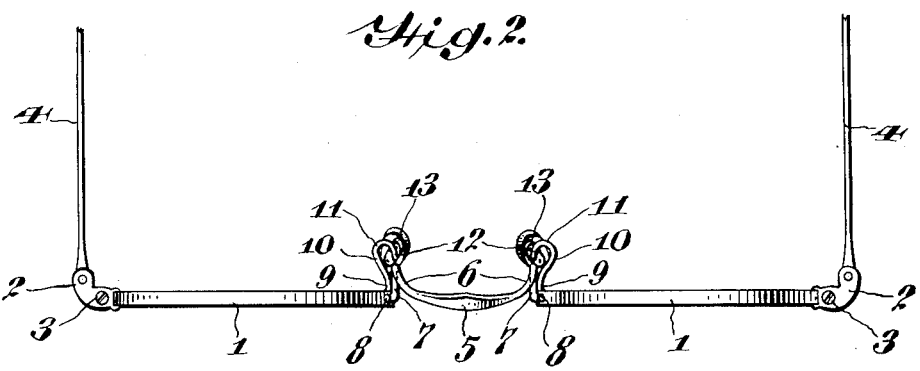
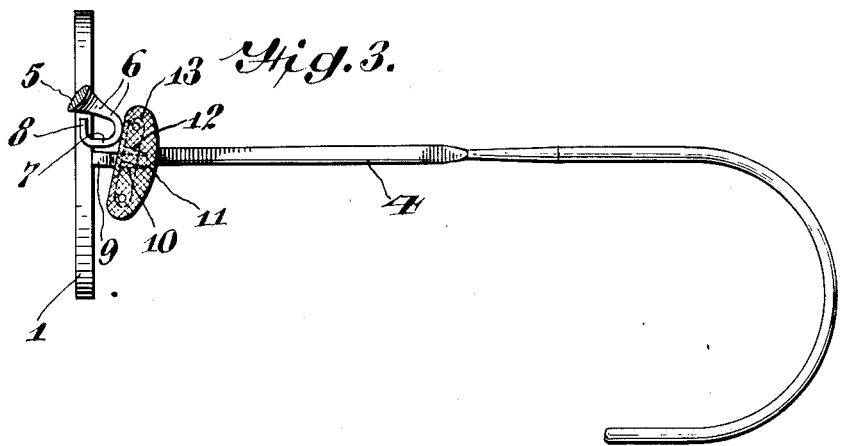
INVENTOR.
Earle J. Richard Beattey
BY Cyrus N. Anderson
Attorney Patented Dec. 19, 1933

1,940,113

UNITED STATES PATENT OFFICE 1,940,113

OPHTHALMIC MOUNTING

Earle J. Richard Beattey, Edgewood, R. I., assignor to Universal Optical Corporation, Providence, R. I., a corporation of Rhode Island Application May 21, 1930. Serial No. 454,241

2 Claims. (Cl. 88—42)

My invention relates to ophthalmic mountings and it has for its general object to provide a mounting of novel construction including means whereby spectacles may be more satisfactorily fitted upon and adjusted to the nose of a wearer than heretofore, as far as I know, has been practicable.

It also is an object of my invention to provide a construction of mounting wherein the opposite ends of the bridge between the lenses are connected to the lens rims or to the lenses at points above a straight line drawn between the centers of the lenses whereby the supports for the nose guards or bearings may be connected to the said rims or to the lenses at points located in such line. It is desirable that the supports for the guards be connected to the rims for the lenses or to the lenses at these points in alinement with the centers of the lenses in order that the guards when applied to that portion of the nose to which they preferably should be applied the lenses are supported with their optical centers in front of and in proper relation to the eyes of a wearer.

It is also an object of the invention to provide means whereby the lenses may be adjusted with readiness in a vertical plane together with the guards connected therewith in order that proper adjustment of the lenses of a pair of spectacles may be made with respect to the eyes to locate the optical centers of the lenses in proper relation to the centers of the eyes.

To the foregoing and other ends my invention comprehends the construction and arrangement of parts as hereinafter described in detail, particularly pointed out in the claims and as illustrated in the drawing wherein I have shown a construction exemplifying my invention in its preferred form.

In the drawing:

Fig. 1 is a view in front elevation of a spectacle frame embodying the invention;

Fig. 2 is a view in top plan; and

Fig. 3 is a view in central section looking toward the left in Figs. 1 and 2.

In the drawing I have shown at 1 the rims for supporting the lenses 1' of a pair of spectacles. The opposite ends of the wires constituting the respective rims are located in adjoining relation to each other and terminate in lugs 2 which are adapted to be detachably secured together by means of screws 3. A slot or notch is formed between the two adjoining lugs at each end of the spectacle frame for the reception of the front ends of the temple wires 4.

The rims 1 are connected or joined together by means of a bridge 5, the central, main body portion of which is slightly curved upwardly and forwardly as indicated in the drawing. It may be noted that the central portion of the bridge is practically in the same plane as that of the lens rims and of the lenses which may be supported therein. The opposite ends of the central or main body portion of the bridge extend rearwardly and downwardly as shown at 6 and then forwardly as shown at 7 and then upwardly as indicated at 8. The upwardly extending portions 8 constitute terminals which in the completed frame are located in the same plane as that of the lens rims. These terminal portions are secured to the rims by soldering or otherwise at points which are located or positioned above a straight line connecting the centers of the lenses or the centers of the rims within which the lenses are supported.

By thus locating the points of connection of the opposite ends of the bridge to the lens rims I am enabled to secure the front ends of the guard supporting arms 9 to the rims at points including the straight line between the centers of the lenses or rims referred to above. The arms 9 extend rearwardly and outwardly as indicated at 10 and then are bent inwardly and forwardly to form loops or bends 11 which are located in a plane extending transversely of the plane of the lenses or of the lens supporting rims. In the drawing the arms 9 are shown as being located in a plane extending very nearly at right angles to the plane of the lens rims 1. But the said arms may be inclined in directions above or below such plane to such an extent as may be desired within practical limits without departing from the principle of my invention.

The inner sides of the forwardly projecting portions 12 of the loops 11 are secured to the outer sides of the nose guards or bearings 13 at points approximately midway between the opposite ends of the said guards or bearings 13.

In practise it is very desirable that the arms for supporting the nose guards be connected to the lens rims or to the lenses of a pair of spectacles at points which are located as nearly as may be practically possible in a straight line connecting the centers of the rims or of the lenses supported therein. By so locating the points of connection of the supporting arms for the guards I am enabled to more readily place the lenses in proper relation to the eyes of a person wearing the spectacles, and at the same time cause the nose guards or bearing pieces 13 to engage the opposite sides of that portion of the nose of a wearer to which the nose guards or bearings properly should be applied; that is to say, that portion of the nose directly opposite the inner corners of the eyes.

For the sake of appearance it is desirable that the bridge 5 by which the rims or the lenses are connected together should be located near the nose of a wearer but without contacting therewith.

By means of the construction shown comprising the loops including the parts 6 and 7 at the opposite ends of the bridge it will be apparent that the central or body portion of the bridge may be adjusted vertically or in the direction of the plane of the rims of the frame so as to accommodate the same to the noses of different wearers.

It will be apparent also that the nose guards or bearings 13 may be adjusted laterally, that is, inwardly or outwardly by an adjustment of the rear end portions of the arms 9 either inwardly or outwardly or by adjustments of the opposite sides of the loops at the rear ends of the said arms toward or from each other. By the provision of nose guard supporting arms with loops upon their rear ends and of the loops or bends at the opposite ends of the bridge 5 I am enabled to obtain a maximum of adjustment of the lenses with respect to the eyes of a person for whom the spectacles are being provided.

By reason of the connection of the front ends of the nose guard supporting arms to the rims or to the lenses in a straight line connecting the centers of the rims or the lenses, and by the connection of the rear ends of the said arms to the guards or bearings at points approximately midway between their opposite ends I am enabled to more evenly distribute the weight of a pair of spectacles upon the nose of the wearer.

Having thus described my invention, what I claim and desire to secure by Letters Patent is:

1. In an ophthalmic mounting, two lens members, a relatively rigid deformable bridge connecting said lens members and having a relatively flat center with rearwardly and downwardly extending portions folded upon themselves and extending forwardly with each of the folded portions in a substantially vertical plane and with the forwardly-extending portions vertically spaced from the rearwardly-extending portions, each of the forwardly-extending portions terminating in a portion lying in substantially the plane of the lenses and extending therealong for a substantial extent and soldered to said lens members, said soldered connection being located solely above a straight line joining the centers of the lenses.

2. In an ophthalmic mounting, two lens members, a relatively rigid deformable bridge connecting said lens members and having a relatively flat center with rearwardly and downwardly extending round wire portions folded upon themselves and extending forwardly with each of the folded portions in a substantially vertical plane and with the forwardly-extending portions vertically spaced from the rearwardly-extending portions, each of the forwardly-extending portions terminating in a portion lying in substantially the plane of the lenses and extending therealong for a substantial extent and soldered to said lens members, said soldered connection being located solely above a straight line between the centers of the lenses, and nose guard arms independently connected to said members on a line including a line connecting the centers of the lenses, whereby independent adjustment of said bridge and nose pads may be had.

EARLE J. RICHARD BEATTEY.